US008010777B2

(12) United States Patent
Nandan et al.

(10) Patent No.: US 8,010,777 B2
(45) Date of Patent: Aug. 30, 2011

(54) MANAGING A DEPLOYMENT OF A COMPUTING ARCHITECTURE

(75) Inventors: Durgesh Nandan, Redmond, WA (US); Shuyi Hu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/824,673

(22) Filed: Jul. 2, 2007

(65) Prior Publication Data

US 2009/0013162 A1  Jan. 8, 2009

(51) Int. Cl.
G06F 1/24 (2006.01)
G06F 15/177 (2006.01)
G06F 9/445 (2006.01)

(52) U.S. Cl. ............ 713/100; 713/2; 709/220; 709/222; 717/176; 717/177

(58) Field of Classification Search ............. 713/2, 100; 709/220, 222; 717/176, 177
See application file for complete search history.

(56) References Cited

U.S. PATENT DOCUMENTS

| | | | |
|---|---|---|---|
| 6,393,605 B1 | 5/2002 | Loomans | |
| 6,604,237 B1 | 8/2003 | Giammaria | |
| 6,986,135 B2 | 1/2006 | Leathers et al. | |
| 7,080,088 B1 | 7/2006 | Lau | |
| 7,200,530 B2 | 4/2007 | Brown et al. | |
| 7,210,143 B2 | 4/2007 | Or et al. | |
| 7,457,853 B1* | 11/2008 | Chari et al. ................ | 709/220 |
| 7,565,416 B1* | 7/2009 | Shafer et al. .............. | 709/220 |
| 2002/0169975 A1* | 11/2002 | Good ............................ | 713/200 |
| 2003/0131078 A1* | 7/2003 | Scheer et al. ............... | 709/220 |
| 2003/0154284 A1 | 8/2003 | Bernardin et al. | |
| 2003/0182452 A1 | 9/2003 | Upton | |
| 2003/0221170 A1 | 11/2003 | Yagi | |
| 2004/0176968 A1 | 9/2004 | Syed et al. | |
| 2004/0255010 A1 | 12/2004 | Finni | |
| 2004/0268298 A1* | 12/2004 | Miller et al. ................ | 717/106 |
| 2005/0138557 A1* | 6/2005 | Bolder et al. .............. | 715/700 |
| 2005/0289536 A1 | 12/2005 | Nayak et al. | |
| 2006/0015866 A1* | 1/2006 | Ang et al. .................. | 717/174 |
| 2006/0037000 A1 | 2/2006 | Speeter et al. | |
| 2006/0041838 A1 | 2/2006 | Khan | |
| 2006/0112383 A1 | 5/2006 | Chang et al. | |
| 2006/0190575 A1* | 8/2006 | Harvey et al. .............. | 709/222 |
| 2006/0230314 A1 | 10/2006 | Sanjar et al. | |
| 2006/0245354 A1* | 11/2006 | Gao et al. ................... | 370/230 |
| 2006/0277248 A1 | 12/2006 | Baxter et al. | |
| 2007/0055972 A1 | 3/2007 | Brown et al. | |
| 2007/0162892 A1* | 7/2007 | Zenz et al. ................. | 717/121 |

OTHER PUBLICATIONS

O'Keefe et al., "Open Source High-Availability Clustering," Red Hat Magazine, Date: May 1, 2007, pp. 1-8, http://www.redhat.com/magazine/009jul05/features/cluster/.

(Continued)

*Primary Examiner* — Vincent T Tran
(74) *Attorney, Agent, or Firm* — Merchant & Gould P.C.

(57) ABSTRACT

Embodiments are provided to deploy a number of computing devices based in part on a deployment file, but the embodiments are not so limited. In an embodiment, a dispatch application can be used to deploy a number of computing devices, wherein the deployment includes a number deployment parameters and functions associated with a configuration of the number of computing devices. The dispatch application can be used to deploy a number of computing devices, including virtual devices, logical devices, and other devices and systems. Other embodiments are available.

19 Claims, 5 Drawing Sheets

OTHER PUBLICATIONS

InfoWorld Virtualization Report, "Microsoft Virtual Machine Manager Beta 2 is Here!," Date: May 1, 2007, pp. 1-38, http://weblog.infoworld.com/virtualization_/archives/virtualization_appstools/index.html.

Lifantsev et al., "Implementation of a Modem Web Search Engine Cluster," Date: May 1, 2007, pp. 1-24, http://www.usenix.org/events/usenix03/tech/freenix03/full_papers/lifantsev/lifantsev_html/index.html.

Rodriguez-Martinez et al., "Automatic Deployment of Application-Specific Metadata and Code in MOCHA," Intitute for Advanced Computer Studies & Department of Computer Science, University of Maryland, Date: Unknown, pp. 1-20, http://drum.umd.edu/dspace/bitstream/1903/1035/2/CS-TR-4067.pdf.

Lacour et al., "Generic Application Description Model: Toward Automatic Deployment of Applications on Computational Grids," Date: Unknown, pp. 1-4, http://www.irisa.fr/paris/Biblio/Papers/Lacour/LacPerPri05grid.pdf.

Tallman, "Project Gabriel: Automated Software Deployment in a Large Commercial Network," Digital Technical Journal, Date: 1995, pp. 56-70, http://wiki.astrogrid.org/pub/Main/KeithNoddle/ProjectGabriel.pdf.

U.S. Patent Office Non-Final Office Action mailed Aug. 18, 2010 in Application No. 11/824,505, 17 pages.

* cited by examiner

MANAGING A DEPLOYMENT OF A COMPUTING ARCHITECTURE

RELATED APPLICATIONS

This application is related to U.S. patent application Ser. No. 11/824,505, filed Jun. 29, 2007, and entitled, "MANAGING A COMPUTING ENVIRONMENT," which is hereby incorporated by reference.

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Reference models and blueprints are useful for building and recreating reliable computing architectures. For example, a blueprint can be used to configure hardware and software components for an enterprise computing environment. A reliable blueprint can be used to build secure architectures which can include network, server, and storage functionality. However, some blueprints can be unreliable and contradictory. For example, a blueprint may designate a particular hardware configuration for a server that is incompatible with a particular purpose. Human error can compound the issue. For example, a number of administrators and associated support personnel may be tasked to manually deploy aspects of an enterprise system in accordance with a particular blueprint. The configuration and deployment can take hours (and often days), and may include starting the process over when a blueprint is misinterpreted or otherwise mismanaged. Correspondingly, a deployment process using an unreliable blueprint can end up being inefficient and costly for an enterprise or other organization.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to deploy a number of computing devices based in part on a deployment file, but the embodiments are not so limited. In an embodiment, a dispatch application can be used to deploy a number of computing devices, wherein the deployment includes a number deployment parameters and functions associated with a configuration of the number of computing devices. The dispatch application can be used to deploy a number of computing devices, including virtual devices, logical devices, and other devices and systems.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to deploy a number of computing devices based in part on a number of deployment requirements. In an embodiment, a dispatch component can use a deployment file to deploy a number of computing devices associated with a defined computing architecture. A deployment file can include a number of deployment parameters and associated functions which can be used when deploying the computing architecture. The dispatch component can be used to quickly, efficiently, and reliably deploy computing devices for testing, debugging, and other operations.

In one embodiment, a dispatch application can be configured as a software application, including executable instructions, and used to deploy a computing architecture based in part on a deployment file. The deployment file can include a number of computing devices and associated configurations, including virtual devices, logical devices, and other devices. For example, the dispatch application can use an XML-based deployment file to configure a cluster of servers according to a defined deployment environment. The dispatch application can use a deployment file which can include a number of deployment parameters and associated functions including, but not limited to: computing device names; deployment packages; computing device roles; dependencies; sequences; certificates; configuration information; port and wires; etc. The dispatch application can use an XML-based deployment file to efficiently deploy and/or reconfigure a computing architecture.

Figure 1:
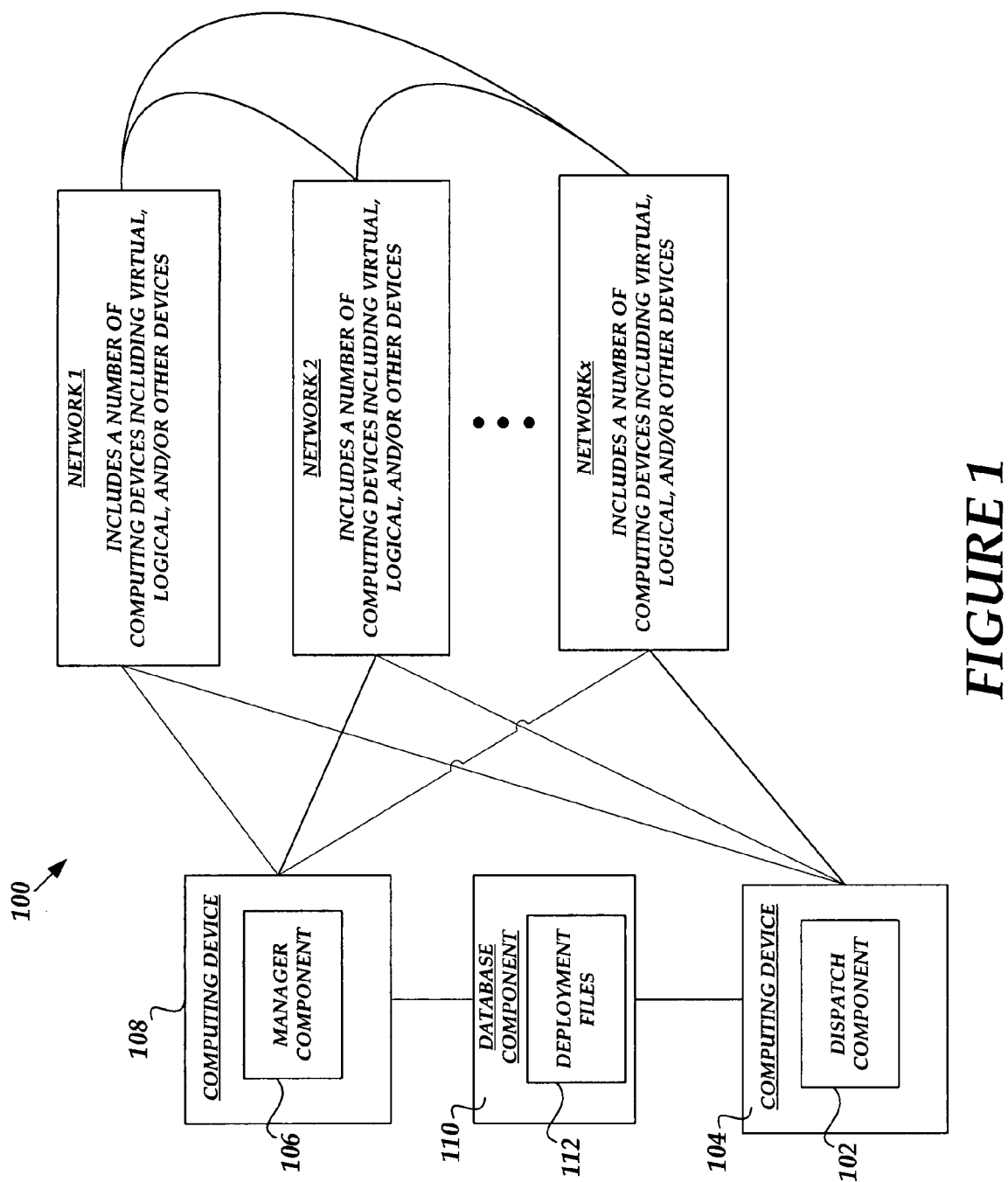
FIG. 1 depicts a block diagram of a computing environment.

FIG. 1 depicts a computing environment 100, under an embodiment. As described below, a dispatch component 102 can be used to deploy a number of computing devices associated with the computing environment 100 and other computing devices and/or computing networks. The dispatch component 102 can be executed from an associated computing device 104 and used to interact with a number of computing devices that may be included as part of a defined deployment blueprint. The dispatch component 102 can also be executed as part of a web-based service using a computing device, such as the computing device 104. For example, the dispatch component 102 can be used to deploy a number of computing devices, as part of a wired, wireless, and/or combination of communication configurations.

The dispatch component 102 can be configured to deploy a number of computing devices based in part on information associated with a deployment file. As described below, a deployment file can include information associated with the configuration of a number of computing devices. In an embodiment, a deployment file can include a number of parameters and associated functions which define a deployment blueprint or architecture. The dispatch component 102 can use a deployment file when deploying a defined computing architecture as part of a deployment process. For example, the dispatch component 102 can use an XML-based deployment file that includes test cluster configuration parameters and functions when deploying the test cluster.

As used herein, computing device is not intended to be limiting and can refer to any computing device, system, or component, including servers, desktops, handhelds, laptops, software implementations, logical devices, virtual devices, and other computing devices and systems. A logical device can refer to a number of devices or systems which can be grouped as a cluster, wherein one cluster can be defined as a deployment unit. In an embodiment, an XML-based deployment file can be associated with each deployment unit. For example, for a domain of 100 computing devices, a user can create 10 clusters having 10 corresponding XML-based deployment files.

Devices in each cluster can be described as logical devices even though they may coupled on a LAN and domain. Virtual devices can refer to devices or systems that are expecting or configured to accept a type of package. Virtual devices that are expecting the same type of package(s) can be grouped together to define one unit for deployment. As such, one plan can be defined for each unit, including incorporating an associated audit for each unit. As used herein, the term "network" encompasses any configuration of computing devices which are transferring and manipulating information and can be implemented as a wired network, a wireless network, a combination of a wired and a wireless network, and/or other types of communication networks. While FIG. 1 depicts a networked configuration, other configurations are available.

As shown in FIG. 1, the computing environment 100 includes a network 1, a network 2, and a networks (where x is some integer). Each network can include any number of computing devices and networking elements. The computing environment 100 can also include other computing devices that may or may not be associated with a particular network. For example, network 1 may represent a first number of servers associated with a first serving pool and network 2 may represent a second number of servers associated with a second serving pool. Continuing with the example, the dispatch component 102 can be used to deploy any number of computing devices associated with the first serving pool, the second serving pool, and/or one or more of a number of computing devices $D1$-$D_x$ when deploying according to defined blueprint, such as an XML-based deployment file.

As described above, the dispatch component 102 includes functionality to deploy a number of computing devices as defined by a deployment blueprint. In an embodiment, the dispatch component 102 is configured to use an XML-based deployment file when deploying a number of computing devices. The XML-based deployment file can be created and/or edited using a manager component 106, described further below. As shown, the manager component is associated with computing device 108, but other configurations are available.

A database component 110 includes one or more deployment files 112, such as one or more XML-based deployment files for example. The deployment files 112 can include a number of parameters and associated functions that can be used by the dispatch component 102 to deploy a computing architecture. As described further below, and in accordance with an embodiment, the dispatch component 102 includes a number of functions that can be used when deploying a computing architecture. One or more functions associated with the dispatch component 102 can be called to perform various operations associated with one or more operations of a particular deployment.

In one embodiment, the dispatch component 102 can be configured as a software application (see FIG. 2 dispatch application 200) and can be employed on a client device for use in the deployment of computing devices according to a defined deployment blueprint, which can be in the form of an XML-based deployment file. Correspondingly, the dispatch component 102 can use an XML-based deployment file when deploying a number of computing devices according to a defined deployment blueprint. For example, a user can use the dispatch component 102 to consume an XML-based deployment file to deploy computing devices, packages, certificates, etc. to include as part of a deployment architecture.

In another embodiment, the dispatch component 102 can be configured as a user interface (UI) and accessed using a computing device, such as the computing device 104 for example. The dispatch component 102 can be accessed locally or remotely. Correspondingly, a user can use the dispatch component 102, configured as a UI, to deploy a computing architecture as defined by a deployment blueprint. In one embodiment, the UI can be configured as part of a web-based service that users can access after providing proper authentication credentials. The UI can be configured to present deployment options to a user in different ways. For example, the dispatch component 102 can be configured to graphically display deployment options in a user-friendly manner so that users can quickly and efficiently locate an XML-based deployment file when deploying a computing architecture.

With continuing reference to FIG. 1, and as described briefly above, the manager component 106 can be configured to create and/or edit a deployment file that includes a number of deployment parameters and associated functions. The manager component 106 can be configured to provide a consistent user experience when creating and maintaining deployment blueprints. A user can use the manager component 106 to easily and quickly create, update, and otherwise interact with deployment blueprints. As described above, once defined, the dispatch component 102 can be used to deploy the computing architecture defined by a particular blueprint.

In one embodiment, the manager component 106 can be configured as a software application and can be used in defining a deployment blueprint that is associated with a deployment of a number of computing devices. The manager component 106 can be used to create and maintain an XML-based deployment file associated with a blueprint. The XML-based deployment file can be used by the dispatch component 102 when deploying a number of computing devices according a defined deployment blueprint. For example, a user can use the manager component 106 to create an XML-based deployment file, including identifying computing devices, packages, certificates, etc. to include as part of a deployment blueprint. The XML-based deployment file can also be accessed or otherwise communicated to determine the number of computing devices associated with a deployment, including the configuration of each computing device, the software packages associated with each computing device, etc.

The manager component 106 can also be configured as a user interface (UI) and accessed using the computing device 108. The manager component 106 can also be accessed locally or remotely. A user can use the manager component 106 configured as a UI to interactively define a deployment blueprint, such as a deployment blueprint for a testing cluster or debugging cluster for example. In one embodiment, the UI can be configured as part of a web-based service that users can access after providing proper credentials (e.g., authentication, etc.). The UI can be configured to present deployment parameters to a user in different ways. For example, the UI can be configured to provide a graphical blueprint view, allowing a user to drag and drop (or cut and paste) packages, computing devices, and other infrastructure as part of an interaction with a deployment blueprint.

As described above, the manager component 106 can be used to create an XML-based deployment file that can include a number of deployment parameters and associated functions. For example, a user can create an XML-based deployment file for a test cluster, wherein the XML-based deployment file identifies: a number of computing devices to be used for testing; software packages to be included on each computing device; certificates to use during various testing operations, etc. The manager component 106 can be further configured to enable a user to open, view, and validate XML-based deployment files. For example, a user can use the manager component 106 to validate an XML-based deployment file associated with a number of rule and/or schema changes.

The manager component 106 can also be configured to suggest corrective actions when an XML-based deployment file is determined to be invalid or otherwise defective in some way. The manager component 106 can also be configured to automatically take corrective actions when an XML-based deployment file is found to be invalid or otherwise defective. Moreover, certain procedures can be employed to control a check-in and check-out process associated with the use of an XML-based deployment file. For example, certain users may have check-in and check-out permissions while others do not. Once a XML-based deployment file has been checked-in, the dispatch component 102 can be used to deploy the computing architecture defined by the XML-based deployment file.

In certain situations, the manager component 106 can be used to prevent a user or users from manually updating or changing an XML-based deployment file. The manager component 106 can also be used to include versioning and/or historical information as part of the maintenance of an XML-based deployment file. For example, the XML-based deployment file can include information associated with users who have opened and edited an associated deployment blueprint.

The manager component 106 can be used to define an XML-based deployment file for a number of computing devices to include different hardware and/or software configurations. The dispatch component 102 can then use or consume the XML-based deployment file to deploy the computing devices to include the defined hardware and/or software configurations. For example, the dispatch component 102 can use an XML-based deployment file to deploy servers having different hardware and software configurations according to a number of deployment types. As further example, the dispatch component 102 can deploy common server types include SQL servers, Content servers, and web servers. The dispatch component 102 can also be called to deploy middle tier and other components according to an associated blueprint.

In one embodiment, the manager component 106 can be used to define a kind of platform software that can be installed on an associated computing device. The manager component 106 can also define a number of functions to be associated with a computing device. For example a user can use the manager component 106 to define a number of functions which are used by the dispatch component 102 when deploying one or more computing devices that include, but are not limited to: front-end server for a web service (with or without authentication); front-end server for a redirect service (including client/server redirect); front-end server for a research and reference service; back-end database server (e.g., SQL server); content server; a search server; a web server for certain tools (e.g., IPO tools); etc.

With continuing reference to FIG. 1, the database component 110 can be associated and in communication with the dispatch component 102 and the manager component 106, but is not so limited. The database component 110 may be co-located or remotely located. The database component 110 or other repository (e.g., file server(s)) can be used to store information associated with a deployment blueprint and/or users associated therewith. In one embodiment, the database component 110 includes a number of deployment files 112, such as a number of XML-based deployment files for example. For example, a stored deployment blueprint in the form of an XML-based deployment file can be called or otherwise accessed by the dispatch component 102 from the database component 110 when deploying a particular computing architecture. Deployment files can also be stored at other locations, such as in a file server, or in an associated network or networks for example.

The database component 110 can also include a dynamic link library (dll) that includes a number of functions that are associated with a particular deployment file and/or dispatch component. For example, the dispatch component 102 can access certain functions from the dll file when deploying a number of computing devices according to a particular XML-based deployment file. The database component 110 can also include information associated with: reservation status; deployment status; availability status; access credentials; authentication information; etc. In one embodiment, the database component 110 can also include the location (e.g., stored as a path, etc.) of an associated XML-based deployment file and any associated shipment files, if available. In another embodiment, the dll can be included on a computing device associated with the dispatch component 102.

Figure 2:
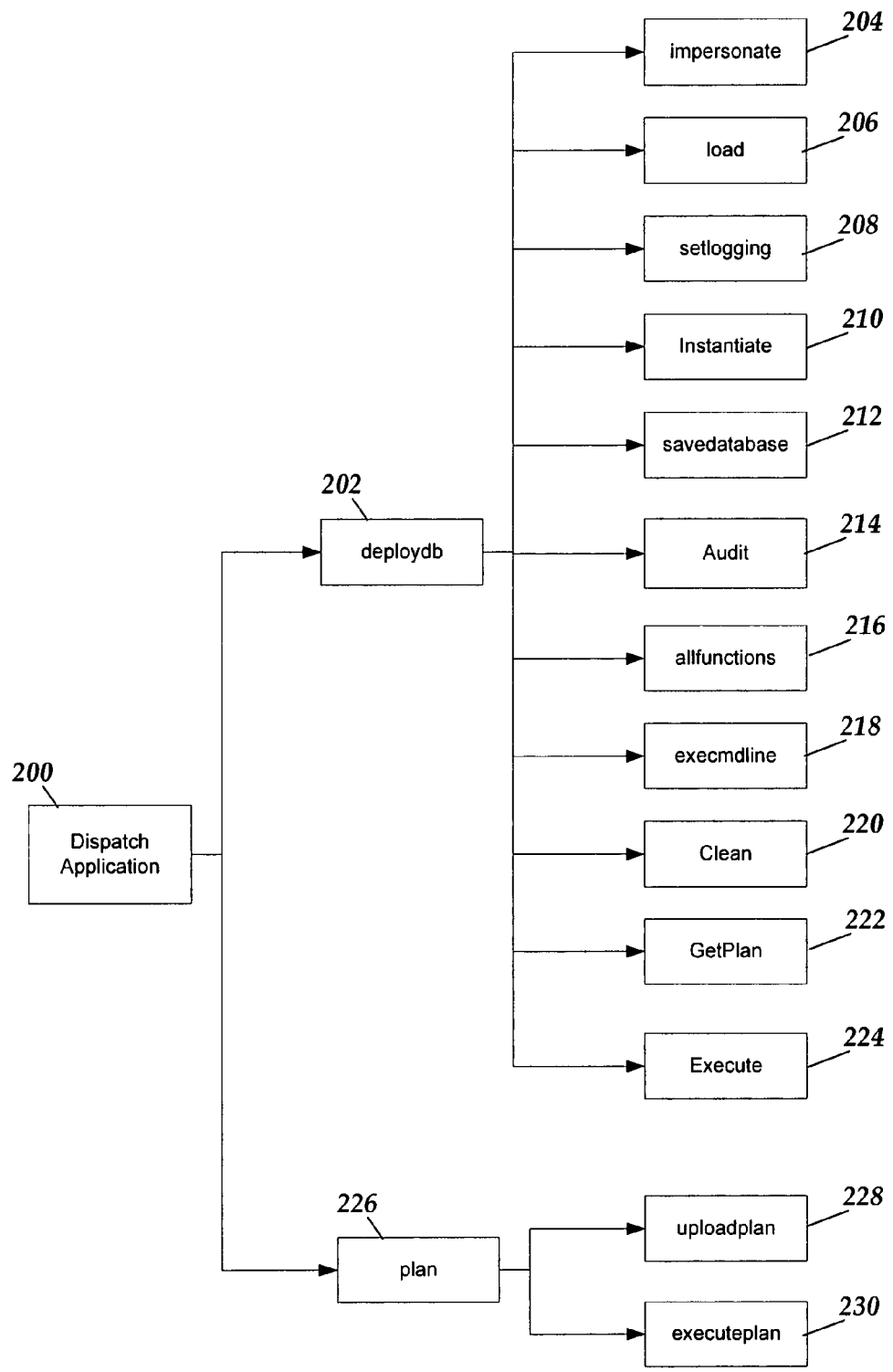
FIG. 2 is a block diagram depicting aspects of a dispatch application.

Referring now to FIG. 2, and according to an embodiment, a block diagram depicts various functions that can be associated with and used by a dispatch application 200. The functions can be implemented as a number of APIs which are included as part of a data link library (dll) (e.g., dispatch.dll). For example, a user can use a Net programming language to consume and leverage the APIs. The dispatch application 200 facilitates seamless automations including customizable UIs and/or reporting. For example, a user can use the dispatch application 200 to monitor and save device states, create and save plans, create reports, etc.

The various functions associated with the dispatch application 200 can be implemented as a number of application programming interfaces (APIs) that can be used when deploying or preparing to deploy a particular computing architecture. In an embodiment, various API functions described below can be exposed using a public class of a dll (e.g., dispatch.dll). A dll can be consumed by the dispatch application 200 and use user-readable XML to perform various deployment and other actions. A number of functions related to deployment can be leveraged using a dispatch object model. Correspondingly, and in accordance with an embodiment, a number of functions can be associated with the dispatch application 200 using an object model as follows:

Object: Dispatch

For example, create object of dispatch.dll as DPInst.

Object DPInst=new Dispatch

A user or application can use the dispatch application 200 in conjunction with a deploydb object 202 when deploying a computing architecture according to a particular deployment file, such as a Machine XML file for example. The deploydb object 202 can be used to perform a variety of operations and a number of functions:

Impersonate function 204 (e.g., DPInst.deploydb.impersonate)—the impersonate function 204 enables a user to pass a username and password with required access to override default access credentials, such as a default username for example. For example, the impersonate function 204 can be used to enable a user to have multiple service accounts which can be used for different computing environments. Based on user requirements and a desired implementation, an appropriate username and password combination can be selected and/or created using the impersonate function 204. In one embodiment, parameters associated with the impersonate function 204 can include domain, username, and password. Default username and password will be used if not impersonated.

Load function 206 (e.g., DPInst.deploydb.load)—the load function 206 can be used to load a deployment file (e.g., a Machine XML file described below) from a specified location. The load function 206 can be used as part of validation to validate using a prescribed schema. The load function 206 can also be used to validate designated device connections. In one embodiment, parameters associated with the load function 206 can include machine.xml and path.

Setlogging function 208 (e.g., DPInst.deploydb.logging)—the setlogging function 208 can be used to set a type of logging required for a particular application. In an embodiment, three logging settings are available: basic, medium, and all (verbose). Using the load function 206 can be a prerequisite to performing logging, including the use of a bike component. A bike component can be described as an agent that can be executed on each computing device in a network. In an embodiment, the dispatch application 200 can communicate a deployment plan to the bike component. The bike component can then download bits (e.g., code, content, etc.) from a centralized location to a local computing device and then can run an actual deployment. The bike component can create a log file, termed a bike log, to record deployment activities on the associated computing device. In one embodiment, parameters associated with the setlogging function 208 can include set and Bikelogatserver (boolean). The bikelogatserver parameter can be used to communicate bike logs from agent machines to a dispatch device.

Instantiate function 210 (e.g., DPInst.deploydb.instantiate)—the instantiate function 210 can be used to perform an instantiation action. Using the load function 206 can be a prerequisite to performing instantiation. The instantiate function 210 or instantiator can operate to add detail to a deployment specification. The instantiate function 210 interacts with a configuration database. In one embodiment, basic deployment directives include Install, Property, Genre, Record, Port, and Wire. The use of the basic deployment directives included as XML is illustrated in the following example:

```
<Machine Name="delivery1">
    <Install Package="websetup" Language="1033">
        <Property Name="NOSSL">1</Property>
    </Install>
    <Genre Name="products">
        <Record Type="string">Professional</Record>
        <Record Type="string">Standard</Record>
    </Genre>
    <Port Name="webimage" Protocol="http">
        <Wire Server="delivery2"/>
    </Port>
</Machine>
```

Versions

The configuration database can be included with a database component (e.g., database component 110) and can include data for multiple versions of packages so that the packages may be detected and managed concurrently. The configuration database can also be included on a dedicated computing device.

If the Version attribute is omitted from an Install element, the instantiate function 210 can select the highest version in the database. For example, the versionless directive:

<Install Package="websetup" Language="1033"/>

Becomes:

<Install Package="websetup" Language="1033" Version="11.0.3814.0"/>

Instead of omitting the Version or defining an exact Version, a user can restrict the Version by setting the MinVersion and MaxVersion attributes.

For example:

```
<Install Package="websetup" Language="1033"
    MinVersion="11.0" MaxVersion="11.0.9999.9999"/>
```

Savedatabase function 212 (e.g., DPinst.deploydb.savedatabase)—the savedatabase function 212 can be used when saving one or more databases, including all include files. A saved database can be evaluated before performing final deployment operations. Using the load function 206 can be a prerequisite to saving a database. In one embodiment, a parameter associated with the savedatabase function 212 is file path, including local and UNC along with target file type (e.g, XML).

Audit function 214 (e.g., DPInst.deploydb.audit)—the audit function 214 or auditor can be used to identify which packages from the library exist on target computing devices. After identifying any packages, the audit function 214 operates to write the detected package identities back to a database. The dispatch application 200 can use packages as an abstract container for changes to a state of a computing device. Packages can include identity, including name, version, and language, which can be used when planning or preparing a deployment. The audit function 214 can use detection data provided as part of the package data.

For example:

```
<Package Name="websetup" Version="11.0.3811.0"
    Language="1033">
    <Detect Handler="wih">{00770409-6000-11D3-8CFE-
0150048383C9}</Detect>
</Package>
```

That detection data can be used to specify how to detect a particular version of a package, allowing each version of the package in the database to provide independent detection data. The detection data can be specific to an install handler for the associated package. For example, the WINDOWS Installer handler uses the ProductCode GUID for detection. The audit function 214 can operate to collect Detect elements for the entire library, sort by handler, and send the sorted Detect elements to the associated handlers on the target computing devices. Each handler can operate to reply with a list of Detected elements, which the audit function 214 can use to insert into a database under the audited computing device.

For example:

```
<Machine Name="delivery1">
    <Detected Package="websetup" Version="11.0.3811.0"
    Language="1033"/>
</Package>
```

The audit function 214 operates to read detection information from a loaded configuration database and can write results back to the database. The audit function 214 can operate to communicate with target computing devices without altering a state of the computing device. Moreover, the audit function 214 can be run in isolation, wherein the results may then be fed into subsequent runs using the dispatch application 200. In such an implementation, the results may be persisted in an external database and extracted before running dispatch again. Alternatively, an independent mechanism may be used to assess the state of a computing device. The results provided can be phrased in terms of package identities and added to the database provided to the dispatch application 200.

As described above, the audit function 214 can be used to audit devices listed in an associated deployment file (e.g., Machine XML file). When used, the audit function 214 can operate to: 1) create a delta of an actual state and a desired state; and 2) create a plan to apply a delta on a target topology. Alternatively, the audit function 214 can be used to output an audit result as an XML file. Using the load function 206 can be a prerequisite to using the audit function 214. In one embodiment, an output parameter associated with the audit function 214 is XML file path.

Allfunctions function 216 (e.g., DPInst.deploydb.allfunctions)—the allfunctions function 216 can be used to synchronously execute the impersonation function 204, load function 206, setlogging function 208, instantiate function 210, and/or the audit function 214. The allfunctions function 216 can also be used to perform all associated executions therewith. In one embodiment, the parameters associated with the allfunctions function 216 include parameters associated with the impersonation function 204, load function 206, setlogging function 208, instantiate function 210, and/or the audit function 214.

Execmdline function 218 (e.g., DPInst.deploydb.execmdline)—the execmdline function 218 can be used to execute various functions as a command line by passing required parameters and/or switches. In one embodiment, the execmdline function 218 uses the allfunctions function 216 to perform the associated operations.

Clean function 220 (e.g., DPInst.deploydb.clean)—the clean function 220 can be used to clean up parameters and other aspects associated with a deployment.

GetPlan function 222 (e.g., DPInst.deploydb.GetPlan)—the GetPlan function 222 can be used to obtain plan outputs as XML. For example, the dispatch application 200 can create a deployment plan which is sent to a bike component for the actual deployment. The deployment plan can include a list of downloads and what action(s) to implement. Actions may be copy files, execute msi, etc. In one embodiment, an output parameter associated with the GetPlan function 222 is an XML file.

Execute function 224 (e.g., DPInst.deploydb.execute)—the execute function 224 or executor can be used to deploy a computing architecture, based in part on information associated with the deploydb object 202. Accordingly, the execute function 224 can execute a deployment plan. The format of the plan includes flexibility when generating plans.

In an embodiment, a Run element provides a control structure and serves as a context for executing one or more tasks. Tasks can be ordered serially or run in parallel. Moreover, tasks can be nested inside of other Run tasks to provide an elaborate control structure. For example, the structure below downloads everything first and then performs an install:

```
<Run Order="serial">
    <Run Order="parallel">
        <Download Machine="delivery1">...</Download>
        <Download Machine="delivery2">...</Download>
    </Run>
    <Run Order="parallel">
        <Run Order="serial" Machine="delivery1">
            <Install>...</Install>
        </Run>
        <Run Order="serial" Machine="delivery2">
            <Install>...</Install>
        </Run>
    </Run>
</Run>
```

The above context also can be used to include preconditions and thresholds to test before and/or during execution. In an embodiment, the execute function 224 can be used to track maintenance windows, failure rates, network traffic, machine performance, etc. The execute function 224 can then operate to make certain deployment decisions based on the tracked parameters. Moreover, the execute function 224 can be controlled to execute actions in any order and/or one at a time, so that certain tasks may be executed even though others are blocked.

The execute function 224 can also operate to translate tasks in the execution plan into messages (e.g., BMCP messages) to send to target servers. For example, tasks can be translated into the BMCP protocol to tune the SOAP XML according to the XPI expected by a bike handler. Alternatively, a generic control structure may be used for dispatching messages to various targets. As noted above, additional remote actions can be implemented. For example, an implementation may communicate with load balancers, run "smoke tests" to validate a deployment, or trigger a notification and wait for an acknowledgment. The execute function 224 can also operate to provide options for logging each remote action. For example, the WINDOWS Installer handler can send back an entire install log as the install occurs. In one embodiment, the impersonation function 204, load function 206, and setlogging function 208 can be used before using the execute function 224.

As shown in FIG. 2, a user or application can also use the dispatch application 200 in conjunction with a plan object 226. The plan object 226 can be used to load an existing plan from a specified directory, wherein the plan can be based on a XML-based deployment file (e.g., Machine XML). The plan object 226 can be used to perform a variety of operations, which include a number of functions:

Uploadplan function 228 (e.g., DPInst.plan.uploadplan)—the uploadplan function 228 can be used to upload a plan from a specified location or plan file, such as a plan.xml file for example. In one embodiment, a parameter associated with the uploadplan function 228 is the plan xml parameter.

Executeplan function 230 (e.g., DPInst.plan.executeplan)—the Executeplan function 230 can be used to deploy a computing architecture based in part on information associated with the deploydb object 202.

An application that is consuming the dispatch object model and associated functions may have access to the devices being deployed and to a definitive software library located on a file server or other location where the bits to be deployed can be located.

Figure 3:
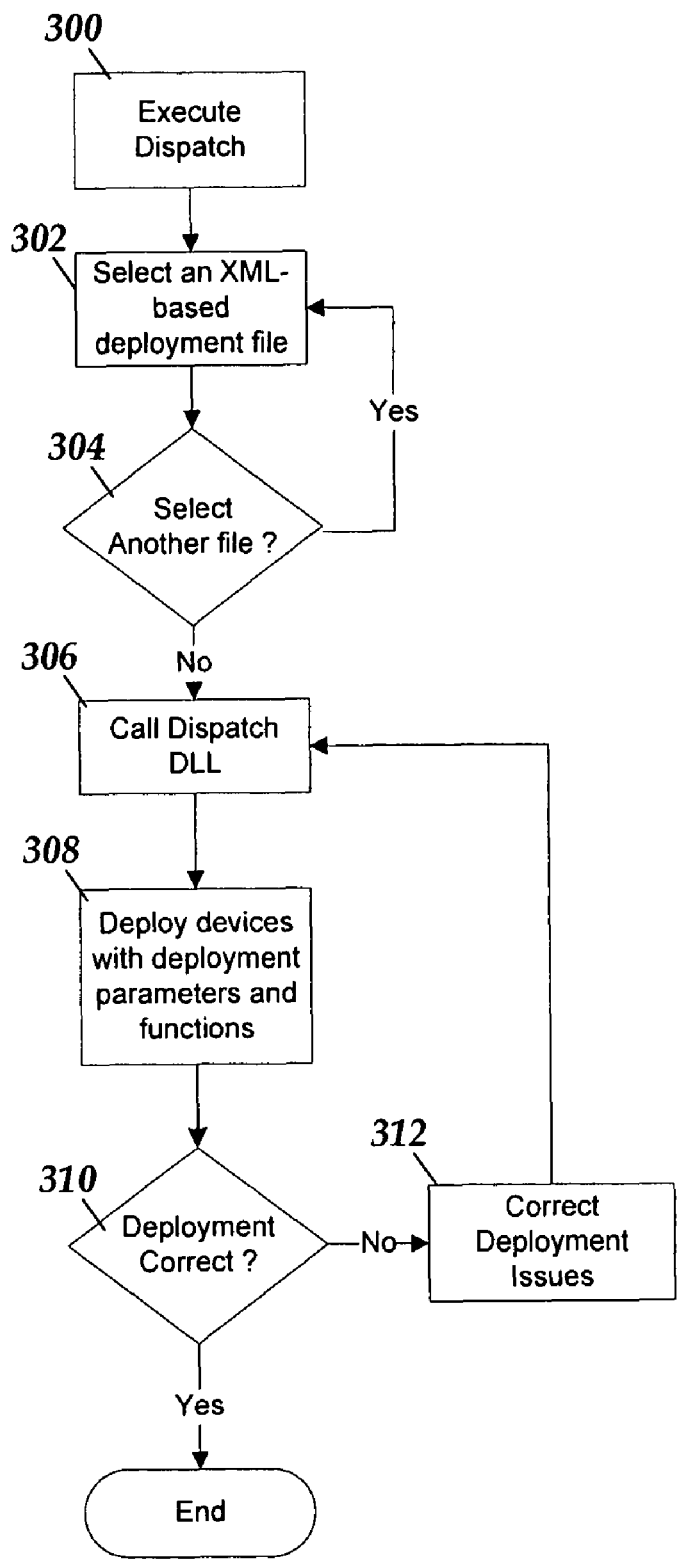
FIG. 3 is a flow diagram illustrating operations associated with a deployment of a computing architecture.

FIG. 3 is a flow diagram illustrating a deployment of a computing architecture, in accordance with an embodiment. As described herein, a number of XML-based deployment files (e.g., a number of Machine XML files) can be used when deploying a number of computing devices as part of a defined deployment blueprint. At 300, a user can use a dispatch application (such as the dispatch application 200 of FIG. 2 for example) to execute a dispatch operation. For example, a user can use the dispatch application 200 in the form of an interactive UI to issue a dispatch command in preparing to deploy a computing architecture. The dispatch operation at 300 can be used to deploy a number of computing devices according to an associated XML-based deployment file, such as a Machine XML file for example. At 302, the dispatch application can be used to select an XML-based deployment file to use as part of the deployment of the computing architecture.

At 304, the user can elect to choose another XML-based deployment file for the deployment. The flow returns to 302 if the user would like to add another XML-based deployment file as part of the deployment. If the user does not want to add another XML-based deployment file, the flow proceeds to 306 and the dispatch application can call dispatch.dll to use the associated dispatch functions (see discussion of FIG. 2 above). At 308, the dispatch application operates to deploy the associated devices including the deployment parameters and associated functions as defined by the selected number of XML-based deployment files.

At 310, the user can assess the devices associated with the deployment to verify that the deployment is correct and what the user intended. If the deployment is not correct, at 312 the user can use a managing application and/or dispatch application to correct any issues associated with the incorrect deployment, and the flow returns to 306. If there are no issues with the deployment, the flow ends and the user can use the deployed computing architecture for an intended use or uses.

Figure 4:
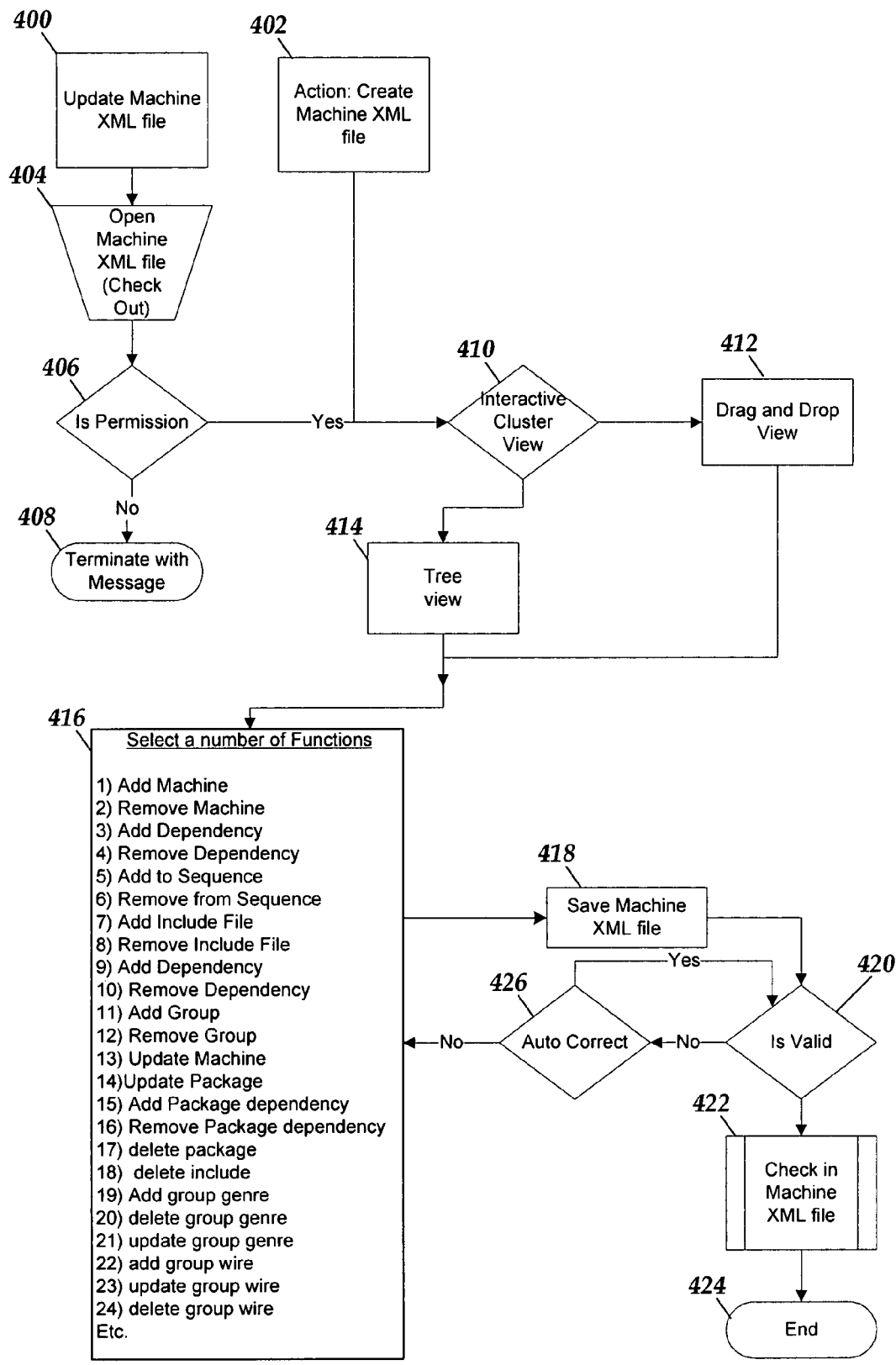
FIG. 4 is a flow diagram illustrating creating a deployment blueprint associated with the configuration of a number of devices.

Referring now to FIG. 4, a flow diagram illustrates using a managing application to create a deployment blueprint for a computing architecture, under an embodiment. In one embodiment, a deployment blueprint is configured as an XML-based deployment file that includes a number of deployment parameters associated with the particular blueprint. The term "machine" includes physical computing devices, logical computing devices, virtual computing device, and other devices, systems, software, and logical components.

As shown in FIG. 4, the flow can begin from two starting points 400 and 402, but is not so limited. At 400, a user can use the managing application to update a deployment blueprint for an associated computing architecture. As shown in FIG. 4, the deployment blueprint file is referred to as a Machine XML file. The Machine XML file may be stored locally or remotely and accessed accordingly. In one embodiment, the Machine XML file defines a number of deployment parameters and functions that are associated with a defined blueprint. The Machine XML file can include parameters associated with a number of defined elements, attributes, values, etc. The Machine XML file can be used as a blueprint when deploying a number of computing devices according to a defined computing architecture.

At 404, the user can use the managing application to locate and open (also referred to as check-out) the associated Machine XML file. For example, the managing application can present a number of Machine XML files to the user, where certain Machine XML files are accessible (have permissions) and others are not (no permissions). At 406, the managing application checks to see whether the user has the proper access permissions to update the Machine XML file. For example, the managing application can compare a user's credentials to credentials stored in a database or other repository. If the user does not have permission to update the Machine XML file, at 408 the managing application can operate to terminate the update session with an error message that informs the user that access is not permitted based on the user credentials or other permission parameters. Alternatively, the user may view the Machine XML file as "read-only." If the user does have permission to update the Machine XML file, the flow proceeds to 410, described below.

A user can also use the managing application to create a deployment blueprint (e.g., Machine XML file) for an associated computing architecture at 402. At 410, the user (from 406 as well) can select from two different interactive views using the managing application. At 412, the user has opted to use a "drag and drop" view to interact with the Machine XML file. Using this view, the user can drag and drop select objects according to a desired computing architecture. For example, a user can drag and drop machines, dependencies, sequences, packages, groups, etc. using this view.

Alternatively, at 414 the user can opt to use a "tree view" to interact with the Machine XML file. Using the tree view, the user can add and remove nodes, such as machines, dependencies, sequences, packages, groups, etc. for example. In one embodiment, the managing application is configured to switch from the drag and drop view to the tree view by clicking a button or using CTRL and an associated key. In the views described above, available computing devices, packages, etc. can be graphically presented to an authorized user for use in creating and or edited a deployment blueprint. Other views and interactive presentations are available and the embodiments and examples described herein are not intended to be limiting.

Once a user has elected a preferred view, the flow proceeds to 416 and the user has a number of available options to select from which results in the creation or generation of a deployment blueprint in the form of a Machine XML file. In one embodiment, the number of available options corresponds with the creation or generation of a number of application programming interface (API) functions. Correspondingly, the API functions can be encapsulated in a dll that can be installed on (or included as part of) a computing device, wherein a number of applications, including hosted applications, can consume the associated functions. As shown in FIG. 4, the user has a number of available API functions to select from which include, but are not limited to: Add Machine; Remove Machine; Add Dependency; Remove Dependency; Add to Sequence; Remove from Sequence; Add include File; Remove include File; Add Group; Remove Group; Update Machine; Update Package; Add Package Dependency; Remove Package Dependency; Delete Package; Delete Include; Add Group Genre; Delete Group Genre; Update Group Genre; Add Group Wire; Update Group Wire; and, Delete Group Wire; etc.

Using the managing application, a use can select from one or more of the available API functions which can be presented to the user based on the selected view. Once the user has selected one or more API functions for the deployment file, the flow proceeds to 418 and the number of selected API functions and other user actions are designated and saved to an associated Machine XML file. The Machine XML file can be stored locally or remotely for future use. At 420, the Machine XML file is validated against an associated validation schema. As part of the validation process, the Machine XML file can also be checked for other errors and inconsistencies. For example, a number of validation scenarios can include: validating to determine if string values are compatible with prescribed formats; validating schema compatibility (e.g., determine if defined machine XML is compatible with defined XML schema); and, validating to determine existence of packages (e.g., can be defined by path to package). An example of a validating schema is described further below.

If the Machine XML file passes the validation process, the flow proceeds to 422 and the Machine XML file can be checked-in for use in deploying the parameters and functions associated therewith and the flow ends at 424. If the Machine XML file does not pass the validation process, the flow proceeds to 426 and, if enabled, the managing application can apply an autocorrect process. If the autocorrect process is disabled, the flow returns to 416 and the managing application can operate to present a number of issues associated with the validation process to the user.

Correspondingly, a user does not have to wait for a deployment to begin to determine if there are issues with a deployment blueprint. Thus, the above-described deployment process provides a preemptive solution which can ultimately save users time and operate to reduce issues when deploying a computing architecture. As an example, the managing application can operate to suggest a number of corrective actions that a user can take to overcome one or more issues. The user can then use a suggested action for a validation issue. Once the user is satisfied with the changes, including any corrections, the flow again proceeds to 418 as described above. On the other hand, if the autocorrect process is enabled, the managing application can operate to automatically correct any issues associated with the validation process and pass the changes on and repeat validation at 420.

In an embodiment, various API functions described above can be exposed using a public class of a dll (e.g., machinexml.dll). A dll can be consumed by the managing application (e.g., as a UI) to present user-readable machine XML to perform various actions. A number of functions related to deployment can be leveraged using a machine XML object model.

In one embodiment, a number of functions can be created or generated by the managing application using an object model as follows:
  Object: MachineXML
  For example create object Machine of machimexml.dll as MXM:
    Object MXM=new machinexml.xml
  The open function (e.g., MXM.open) can be used to open any existing machine.xml files. A user may pass a local path, universal naming convention (UNC) path, or other designated path.

The validation function (e.g., MXM.validation) can operate to conform an XML file with a defined schema. For example, the validation function can be used to ensure that machine XML files conform to a defined schema. In one embodiment, the function returns a true indication if the file conforms with the defined schema; otherwise, the function operates to return a false indication and associated details. The validation function can be used in a variety of scenarios. For example, the validation function can be used to: validate whether string values are compatible with prescribed formats; validate schema compatibility, such as whether a deployment file is compatible with a defined schema; and, validate the existence of certain packages.

The update function (e.g., MXM.update) allows a user to save updated machine XML files after a required validation. In one embodiment, the update function uses the machine path as a string parameter with an option to replace file or create a new file.
  Object: Machine
  For example, create object Machine of machimexml.dll as MXM.
  The add function (e.g., Mxm.machine.add) enables users or parent applications to add a machine to a machine XML file. Users can create a machine XML object and assign a machine XML file thereto before calling this function; otherwise, the function may result in error. In one embodiment, the managing application is configured to pass the following parameters for this function:
    i. Override function
    ii. Parameters: machinename, group, sequence, order
    iii. Parameters: accountname, domain, user
    iv. Parameters: Installpackage, flavor
  The update function (e.g., Mxm.machine.update) enables users or parent applications to update existing machine information for an associated machine XML file. Users can create a machine XML object and assign a machine XML file thereto before calling this function; otherwise, the function may result in error. In one embodiment, the managing application is configured to pass the following parameters for this function:
    i. Override function
    ii. Parameters: machinename, group, sequence, order
    iii. Parameters: accountname, domain, user
    iv. Parameters: Installpackage, flavor
  The delete function (e.g., Mxm.machine.delete) enables users or parent applications to delete a machine from an associated machine XML file. Users can create a machine XML object and assign a machine XML file thereto before calling this function; otherwise, the function may result in error. In one embodiment, the managing application is configured to pass the following parameter for this function:
    i. Parameter: machinename
  An example of a corresponding output is as follows:

```
<Machine Name="TK2OFFWB237" Group="RTM">
    <Account Name="office.aws.default.user" Domain="PHX" User="_oapppool" />
    <Install Package="office.ipo.aws" Flavor="ship" />
</Machine>
```

Object: Package
  For example, create object Machine of machimexml.dll as MXM.
  The add function (e.g., Mxm.package.add) enables users or parent applications to add a package to an associated machine. In one embodiment, any dependency packages should be added before adding a main package. As described below, once a dependency package is added, a dependency function can be used to update the dependency package. Users can create a machine XML object and assign a machine XML file thereto before calling this function; otherwise, the function may result in error. In one embodiment, the managing application is configured to pass the following parameters for this function:
    i. Parameters: machinename, name, flavor, version
  The update function (e.g., Mxm.package.update) enables users or parent applications to update a package of an associated machine. In one embodiment, any dependency packages should be added before adding a main package. As described below, once a dependency package is added, a dependency function can be used to update the dependency package. Users can create a machine XML object and assign a machine XML file thereto before calling this function; otherwise, the function may result in error. In one embodiment, the managing application is configured to pass the following parameters for this function:

i. Parameters: machinename, name, flavor, version

The dependency function (e.g., Mxm.package.dependency) enables users or parent applications to update a dependency in a package of an associated machine. Users can create a machine XML object and assign a machine XML file thereto before calling this function; otherwise, the function may result in error. In one embodiment, the managing application is configured to pass the following parameters for this function:

i. Parameters: parentname, name, flavor, version

The remove dependency function (e.g., Mxm.package.removedependency) enables users or parent applications to remove a dependency in a package of an associated machine. Users can create a machine XML object and assign a machine XML file thereto before calling this function; otherwise, the function may result in error. In one embodiment, the managing application is configured to pass the following parameters for this function:

i. Parameters: machinename, parentname, name, flavor, version

The delete function (e.g., Mxm.package.delete) enables users or parent applications to delete a package of an associated machine. In an embodiment, one or more dependency packages are automatically deleted once an associated parent package is dropped. Users can create a machine XML object and assign a machine XML file thereto before calling this function; otherwise, the function may result in error. In one embodiment, the managing application is configured to pass the following parameters for this function:

i. Parameters: machinename, name

An example of a corresponding output is as follows:

```
<Package Name="office.ipo.ULSReport" Flavor="ship" Version="1">
    <Dependency Package="jukebox.wires" />
    <Dependency Package="office.ipo.ulsreport" Flavor="ship" Language="1033" />
</Package>
```

Object: Include

For example, create object Machine of machimexml.dll as MXM.

The add function (e.g., Mxm.include.add) enables users or parent applications to add an include path to a machine XML file. The function can be called in conjunction with machine XML file update functions. The include path can then be incorporated into the resultant machine XML file. In one embodiment, when the machine XML file is consumed for deployment, an include path is expanded in a main XML file which contains all such includes and machine XML files. The main XML file is the source file for a deployment engine. Users can create a machine XML object and assign a machine XML file thereto before calling this function; otherwise, the function may result in error. In one embodiment, the managing application is configured to pass the following parameter for this function:

i. Parameters: path

The update function (e.g., Mxm.include.update) enables users or parent applications to update an include path to a machine XML file. The function can be called in conjunction with machine XML file update functions. The include path can then be incorporated into the resultant machine XML file. In one embodiment, when the machine XML file is consumed for deployment, an include path is expanded in a main XML file which contains all such includes and machine XML files. The main XML file is the source file for a deployment engine. Users can create a machine XML object and assign a machine XML file thereto before calling this function; otherwise, the function may result in error. In one embodiment, the managing application is configured to pass the following parameter for this function:

i. Parameters: path

The delete function (e.g., Mxm.include.delete) enables users or parent applications to delete an include path from a machine XML file. Users can create a machine XML object and assign a machine XML file thereto before calling this function; otherwise, the function may result in error. In one embodiment, the managing application is configured to pass the following parameter for this function:

i. Parameters: path

Object: Group

The group object provides for the grouping of machines from a configuration perspective. In one embodiment, a configuration applied to a group will be applied to all the machines associated with the group.

For example, create object Machine of machimexml.dll as MXM.

The add function (e.g., Mxm.group.add) enables users or parent applications to add a group to a machine XML file. Users can create a machine XML object and assign a machine XML file thereto before calling this function; otherwise, the function may result in error. In one embodiment, the managing application is configured to pass the following parameter for this function:

i. Parameters: name

The update function (e.g., Mxm.group.update) enables users or parent applications to update a group of an existing or new machine XML file. Users can create a machine XML object and assign a machine XML file thereto before calling this function; otherwise, the function may result in error. In one embodiment, the managing application is configured to pass the following parameters for this function:

i. Parameters: oldname, newname

The delete function (e.g., Mxm.group.delete) enables users or parent applications to delete a group from a machine XML file. Users can create a machine XML object and assign a machine XML file thereto before calling this function; otherwise, the function may result in error. In one embodiment, the managing application is configured to pass the following parameter for this function:

i. Parameters: name

The add function (e.g., Mxm.group.genre.add) enables users or parent applications to add a genre that is to be associated with one or more machines. The genre can be described as an indexed array of records, which hold data. Records are only necessary in the package to provide default values. A genre is a configuration item that may be applied on multiple machines. In an embodiment, the genre can be stored in a registry and surfaced using a number of APIs, such as Jukebox APIs for example. Users can create a machine XML object and assign a machine XML file thereto, followed by a genre object for an associated group before calling this function; otherwise, the function may result in error. In one embodiment, the managing application is configured to pass the following parameters for this function:

i. Parameters: genrename, recordtype

The update function (e.g., Mxm.group.genre.update) enables users or parent applications to update a genre that is associated with one or more machines. Users can create a machine XML object and assign a machine XML file thereto, followed by a genre object for an associated group before calling this function; otherwise, the function may result in error. In one embodiment, the managing application is configured to pass the following parameters for this function:

i. Parameters: genrename, recordtype

The remove function (e.g., Mxm.group.genre.remove) enables users or parent applications to delete a genre that is associated with one or more machines. Users can create a machine XML object and assign a machine XML file thereto, followed by a genre object for an associated group before calling this function; otherwise, the function may result in error. In one embodiment, the managing application is configured to pass the following parameter for this function:

i. Parameters: genrename

When instantiating, the associated records can be given Index attributes (unless explicitly provided) and default values from the package are provided for any values not given at the Machine or Group levels. In one embodiment, genres that are explicitly declared for a package are copied from a Group declaration.

The example below illustrates the use of genres:

```
<Package Name="logging" Language="1033" Version="11.0.3814.0">
  <Genre Name="levels"/>
  <Genre Name="DomainName">
    <Record Type="string">localhost</Record>
  </Genre>
  <Genre Name="verbose">
    <Record Type="int">0</Record>
  </Genre>
</Package>
<Group Name="delivery">
  <Genre Name="levels">
    <Record Type="int">99</Record>
    <Record Type="int">0</Record>
    <Record Type="int">1</Record>
  </Genre>
</Group>
<Machine Name="delivery1" Group="delivery">
  <Install Package="logging" Language="1033"/>
  <Genre Name="DomainName">
    <Record Type="string">www.office.net</Record>
  </Genre>
</Machine>
Gets instantiated like so:
<Machine Name="delivery1" Group="delivery">
  <Install Package="logging" Language="1033"
    Version="11.0.3814.0"/>
  <Genre Name="levels">
    <Record Index="0" Type="int">99</Record>
    <Record Index="1" Type="int">0</Record>
    <Record Index="2" Type="int">1</Record>
  </Genre>
  <Genre Name="DomainName">
    <Record Index="0" Type="string">www.office.net</Record>
  </Genre>
  <Genre Name="verbose">
    <Record Type="int">0</Record>
  </Genre>
</Machine>
```

In the above example, records in the "levels" genre are taken from the "delivery" group. The "DomainName" record was defined at the Machine level and overrides a default given in the package, and the "verbose" record assumed the default specified in the package.

The add function (e.g., Mxm.group.wire.add) enables users or parent applications to create a new wire or connection string information associated with a component, such as a backend component for example, of an associated machine XML file. In one embodiment, the connection string information can be stored in a registry and surfaced using a number of APIs, such as Jukebox APIs for example. Users can create a machine XML object and assign a machine XML file thereto, followed by a wire object for an associated group before calling this function; otherwise, the function may result in error. In one embodiment, the managing application is configured to pass the following parameters for this function:

i. Parameters: name, recordtype

The update function (e.g., Mxm.group.wire.update) enables users or parent applications to update an existing wire or connection string information associated with a component of an associated machine XML file. Users can create a machine XML object and assign a machine XML file thereto, followed by a wire object for an associated group before calling this function; otherwise, the function may result in error. In one embodiment, the managing application is configured to pass the following parameters for this function:

i. Parameters: name, recordtype

The remove function (e.g., Mxm.group.wire.remove) enables users or parent applications to remove an existing wire or connection string information associated with a component of an associated machine XML file. Users can create a machine XML object and assign a machine XML file thereto, followed by a wire object for an associated group before calling this function; otherwise, the function may result in error. In one embodiment, the managing application is configured to pass the following parameters for this function:

i. Parameters: name, recordtype

Ports and wires can be referred to as connection strings which can be set at runtime (through Jukebox for example). For example, the settings can be accessed through the Jukebox as incoming ports include an indexed array of wires including connection strings to other machines.

Ports are similar to genres. Ports can be indexed, can include default values defined in the package; and can be specified at the Machine or Group level. Ports differ from genres in that they have additional attributes, including Protocol, Server, External, and Postfix attributes. The attributes can be used to generate content in intelligent ways.

In one embodiment, any given port is either a client or a server of a protocol. When server ports are instantiated, they get populated with a connection element that contains the connection string by which clients access an associated port. These strings can be built according to the Protocol attribute (see Table below) and a machine name, wherein the Postfix attribute can be appended to the text.

TABLE

| Protocol | Connection String |
| --- | --- |
| smb | \\machine\postfix |
| http | http://machine/postfix |
| tds | SERVER=machine;postfix |

For example, suppose a database is as follows:

```
<Package Name="backend" Version="11.0.3811.0">
    <Port Name="backend.sql" Protocol="tds" Server="yes" External="no"
        Postfix="DATABASE=be"/>
</Package>
<Machine Name="delivery1" Group="delivery">
    <Install Name="backend" Version="11.0.3811.0">
</Machine>
Gets instantiated to this:
<Machine Name="delivery1" Group="delivery">
    <Install Name="backend" Version="11.0.3811.0"/>
    <Port Name="backend.sql" Protocol="tds" Server="yes" External="no"
        Postfix="DATABASE=backend"/>
    <Connection>SERVER=delivery1;DATABASE=backend</Connection>
    </Port>
</Machine>
```

The Connection element can be used internally for a subsequent phase of the process, in which client ports can be instantiated and wired up to server ports. In one embodiment, when a client port is instantiated, the Wire elements within it are resolved into connection strings according to following rules:

1. If the Wire element has text, use that string directly.
2. If the ServerPort attribute is omitted, assume it has the same Name as the client Port.
3. If the Server attribute is omitted, search machines in the Group hierarchy for the given ServerPort.

The above logic is illustrated by adding the following data to the above example:

```
<Package Name="frontend" Language="1033" Version="11.0.3811.0">
    <Port Name="backend.unc" Protocol="smb" Server="no">
        <Wire>\\products\public\products</Wire>
    </Port>
    <Port Name="backend.sql" Protocol="tds" Server="no"/>
</Package>
<Group Name="delivery">
    <Port Name="backend.unc">
        <Wire>\\delivery\public\store</Wire>
    </Port>
</Group>
<Machine Name="delivery2" Group="delivery">
    <Install Name="frontend" Language="1033" Version="11.0.3811.0"/>
    <Port Name="backend.sql">
        <Wire/>
    </Port>
</Machine>
```

The "delivery2" machine gets instantiated to this:

```
<Machine Name="delivery2" Group="delivery">
    <Port Name="backend.unc" Protocol="smb" Server="no">
        <Wire Index="0">\\delivery\public\store</Wire>
    </Port>
    <Install Name="frontend" Language="1033" Version="11.0.3811.0"/>
    <Port Name="backend.sql" Protocol="tds" Server="no">
        <Wire Index="0" Server="delivery1">
            SERVER=delivery1;DATABASE=backend</Wire>
    </Port>
</Machine>
```

The "backend.unc" port inherited its connection string from the setting in the "delivery" Group. Without that setting, it can inherit the default string provided in the package data. The "backend.sql" port was matched to the server port on "delivery1" and the connection dropped into its Wire element.

In one embodiment, a wiring algorithm can first search in the current Group. If no matches are found, the algorithm can search for a match in the hierarchy, including all matches at an associated depth.

Ports can be placed at the Machine or Group levels. Ports placed at the Group level are inherited by Machines with Packages that include those Ports. In that inheritance, any Wire elements inside the Group can be inherited as well.

Wire elements can also be placed outside of Ports, directly beneath a Machine or Group element. In the Machine case, the Wire applies to all Ports instantiated on that Machine. In the Group case, the Wire applies to all Ports instantiated on all Machines in the Group. An empty Wire in the global group, shown below, can cause Wires to be inferred for all ports.

```
<Group>
    <Wire/>
</Group>
```

Other objects and associated parameters are available.

According to one embodiment, the following schema can be used to present a number of deployment parameters and/or options to a user when defining a deployment blueprint for an associated purpose. For example, the manager component 106 can use the schema when presenting deployment options to a user. As further example, the manager component 106 can include the schema for use in validating a deployment blueprint (e.g., Machine XML files).

Specify Upgrade Logic on Versioning

The range of versions that this relationship specifies is given by a minimum and maximum version minimum version defaults to 0 or is given by MinVersion (inclusive), minVersion (exclusive), or Version.

maximum version defaults to the Package version or is given by MaxVersion (inclusive), maxVersion (exclusive), or Version.

The type attribute defines how to behave when the versions specified are present or absent:

- no <Upgrade>
    if present, leave them alone
    if absent, install them
- Type="replace"
    if present, leave them alone
    if absent, don't install them
- Type="remove"
    if present, remove them
    if absent, don't install them
- Type="exclude"
    if present, don't install this
    if absent, install this and don't install them
- Type="baseline"
    if present, remove them (batch removal instead of rollback/install one by one)
    if absent, don't install them
  Scenarios:
  - This package makes incremental changes on top of previous packages
    use no <Upgrade> elements
  - This package replaces all previous packages but can be installed over top of them
    <Upgrade Type="replace"/>
  - This package replaces all previous packages but does not know how to install over top of them
    <Upgrade Type="remove"/>
  - This package replaces all previous packages but should only be used on a clean machine
    <Upgrade Type="exclude"/>

```
- This package replaces all previous packages but for better
performance not to rollback/install previous packages one by one
       <Upgrade Type="baseline"/>
-->
<xs:element name="Upgrade">
  <xs:complexType>
    <xs:attribute name="Type" type="tns:UpgradeType" />
    <xs:attributeGroup ref="tns:VersionGroup" />
  </xs:complexType>
</xs:element>
<!--
Specify package detection configuration
text( )=data (normally package ID) that allows the handler
to identify that this package exists on a target server
       for example, ProductCode is used to detect MSI
-->
<xs:element name="Detect">
  <xs:complexType>
    <xs:attribute name="Handler" type="xs:string" />
  </xs:complexType>
</xs:element>
<!--
Specify the download information
-->
<xs:element name="Download">
  <xs:complexType>
    <xs:sequence>
      <xs:element ref="tns:Source" />
      <xs:element ref="tns:Resource" maxOccurs="unbounded" />
    </xs:sequence>
  </xs:complexType>
</xs:element>
<!--
Specify the package's key source
text( )=path to the package's key source
-->
<xs:element name="Source">
  <xs:complexType>
    <xs:attribute name="Handler" type="xs:string"
       use="required" />
    <xs:attribute name="Resource" type="xs:string" />
    <!-- used in Download/Source -->
    <xs:attribute name="Id" type="xs:string" />
    <xs:attribute name="Priority" type="xs:string" />
  </xs:complexType>
</xs:element>
<!--
Specify the resources (files to download) for the package
text( )=hash to validate file integrity (CRC check)
-->
<xs:element name="Resource">
  <xs:complexType>
    <xs:simpleContent>
      <xs:extension base="xs:hexBinary">
        <xs:attribute name="Id" type="xs:string" use="required" />
        <xs:attribute name="PreferredSource" type="xs:string" />
        <xs:attribute name="CacheName" type="xs:string" />
        <xs:attribute name="SourceName" type="xs:string" />
      </xs:extension>
    </xs:simpleContent>
  </xs:complexType>
</xs:element>
</xs:schema>
```

A number of examples described below illustrate using a deployment blueprint file, such as an XML-based deployment file.

Example 1

Richard, a tester, wants to add a couple of computing devices to his test cluster TC2. The computing devices have been prepped and are ready for deployment. He launches the manager component 106 and opens the XML-based deployment file for TC2. After opening the deployment file for TC2, Richard adds computing device IPOIWTST1 and computing device IPOIWTST2, and also designates the associated packages to be installed on each computing device. The manager component 106 updates the deployment file for TC2 with the associated modification. When deployment begins, computing device IPOIWTST1 and computing device IPOIWTST2 will receive new bits and configured roles based on the information contained in the modified deployment file for TC2.

Example 2

Julia would like to add a new eight box cluster for an online service package. She launches the manager component 106 and adds eight boxes using the associated setup wizard. Thereafter, Julia creates a machine mapping package, a dependency mapping package, defines installation sequencing, and defines installation dependency. Thereafter, Julie clicks "Create" and a "browser create and save file" dialogue map appears that allows her to save the deployment blueprint as an XML-based deployment file (e.g., machine.xml).

Example 3

Peter has just updated a production machine XML (Prod.xml) file to add a couple of new packages. He launches the manager component 106, opens the Prod.xml file and clicks a "Validate" button of the user interface. Thereafter, the manager component 106 returns a validation message that an attribute is missing from one of the machine tags, including the pertinent information so that Peter can correct the issue. Armed with the knowledge of the validation issue, Peter uses the manager component 106 to edit the Prod.xml file and makes the appropriate change. Peter clicks the "Validate" button again and the manager component 106 returns a validation message of no errors. Once validated, Peter is ready for deployment using the validated Prod.xml file for his blueprint.

Example 4

An application online test team wants to automate deployment on their test clusters. They need to control deployment related functions like scheduling, logging based on configuration, etc. and pick a job from a particular location. They also want to customize the dispatch application UI for reporting and secure it just for their management. To accomplish the aforementioned functionality, they use the dispatch object model described above to create a tool that enables them to visually control deployment, store deployment history, job tracking, and several other customized functions. Now for deployment, instead of engaging their ops team, they use the created tool. They also use the tool for automatic and bulk deployment, and in build-verification-test (BVT) to find issues at an early stage of service development.

Embodiments described herein can be used when defining and/or using a blueprint associated with the deployment of a number of computing devices. Various embodiments provide a quick and efficient way to define and/or use a blueprint associated with a computing architecture. For example, a user can define a blueprint for a cluster of servers, wherein the cluster can be deployed according to the defined blueprint. A user can define a blueprint which then can be used to deploy computing devices for testing code and programs, debugging code and programs, and/or performing other configuration, testing, and computing operations. For example, a number of computing devices can be deployed according to a defined blueprint, including a defined operating system (OS), defined middleware, and/or defined test bits in accordance with particular deployment parameters.

Embodiments enable users and applications to: create and deploy a blueprint of a logical cluster, edit/view existing blueprints, suggest corrective actions, take corrective actions, validate packages, and perform other deployment actions. An associated schema that is compatible with service modeling language (SML) and other schema types can be used in conjunction with the XML-based schema described above. In one embodiment, an XML-based schema can be used to transition to an SML-based schema, thereby providing an avenue for integration with a dynamic systems initiative (DSI), such as when defining a design state of a data center for example. Accordingly, an SML-based deployment file can be derived from an XML-based deployment file by using an XML-based schema to transition to an SML-based schema. The dispatch application can use the SML-based file when deploying a computing architecture.

Exemplary Operating Environment

Figure 5:
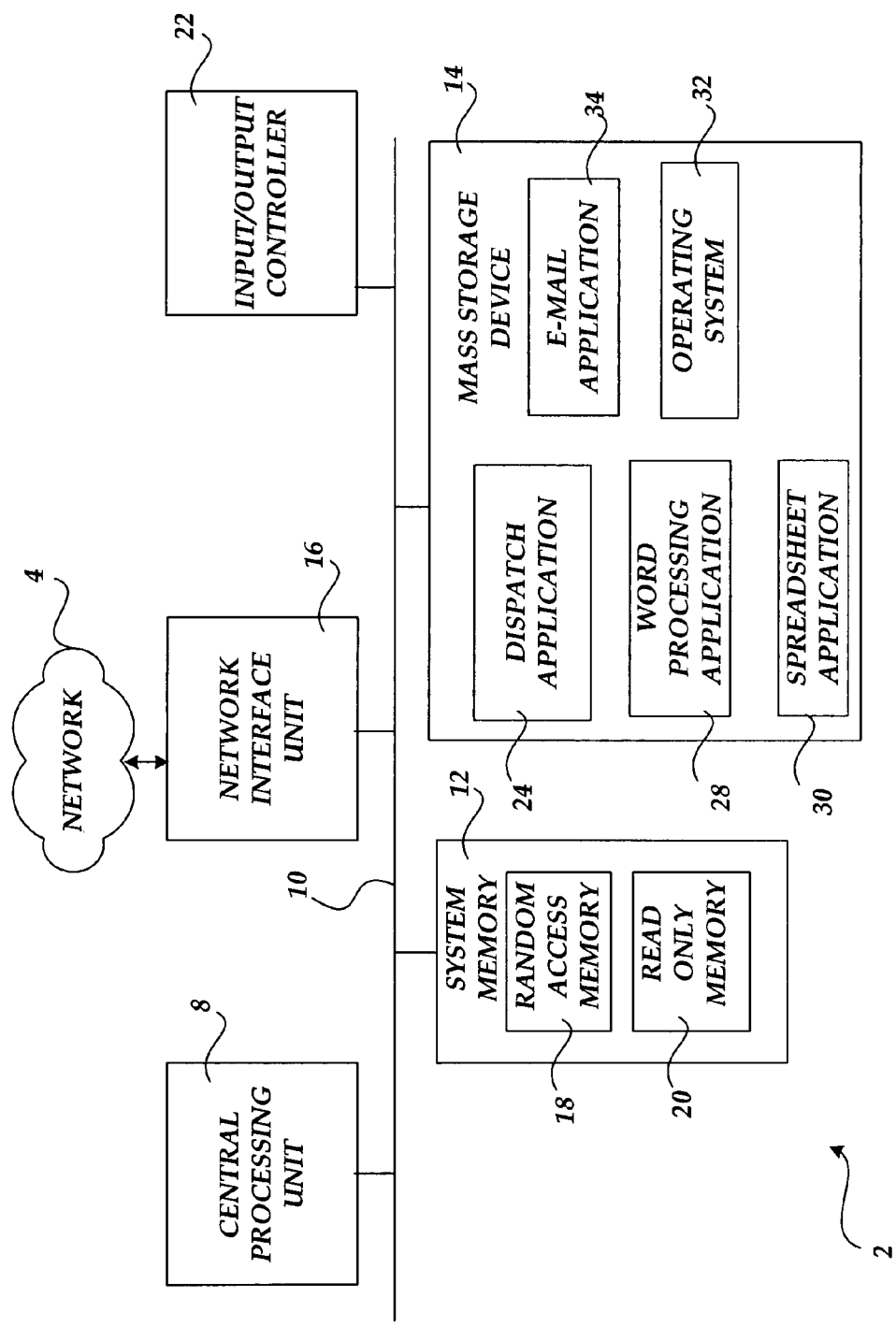
FIG. 5 is a block diagram illustrating a computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a dispatch application 24, a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer storage medium not consisting of a propagated data signal and including executable instructions which, when executed, manage aspects of a computing environment by:
receiving a dispatch command associated with a deployment of a plurality of computing devices;
receiving an indication associated with selection of a deployment file to be used in conjunction with the deployment of the plurality of computing devices, wherein the deployment file includes one or more deployment parameters and one or more deployment functions for use in the deployment of the plurality of computing devices, and wherein the one or more deployment functions comprise at least an audit function;
executing the audit function on a first computing device of the plurality of computing devices, comprising:
detecting a first set of packages on the first computing device of the plurality of computing devices;
identifying a first set of desired packages for the first computing device based on the one or more deployment parameters of the deployment file; and
determining a first package change between the first set of detected packages and the first set of desired packages for the first computing device;
executing the audit function on a second computing device of the plurality of computing devices, comprising:
detecting a second set of packages on the second computing device of the plurality of computing devices;
identifying a second set of desired packages for the second computing device based on the one or more deployment parameters of the deployment file; and
determining a second package change between the second set of detected packages and the second set of desired packages for the second computing device, wherein the second package change is different from the first package change; and
deploying the plurality of computing devices according to the deployment file, wherein deploying the plurality of computing devices includes applying the first package change to the first computing device and the second package change to the second computing device.

2. The computer storage medium of claim 1, wherein the instructions, when executed, manage aspects of the computing environment by deploying a data center computing architecture.

3. The computer storage medium of claim 1, wherein the instructions, when executed, manage aspects of the computing environment by receiving an indication associated with the selection of a second deployment file to be used in conjunction with the deployment of a plurality of different computing devices, wherein the second deployment file includes one or more different deployment parameters for use in the deployment of the plurality of different computing devices.

4. The computer storage medium of claim 1, wherein the instructions, when executed, manage aspects of the computing environment by deploying the plurality of computing devices including using the one or more deployment functions to deploy the plurality of computing devices to include the one or more deployment parameters as defined by an XML-based deployment file.

5. The computer storage medium of claim 1, wherein the instructions, when executed, manage aspects of the computing environment by calling a load function to load the deployment file in preparing to deploy the one or more computing devices.

6. The computer storage medium of claim 5, wherein the instructions, when executed, manage aspects of the computing environment by calling the load function to validate the deployment using a prescribed schema.

7. The computer storage medium of claim 5, wherein the instructions, when executed, manage aspects of the computing environment by calling the audit function to audit each of the plurality of computing devices associated with the deployment.

8. The computer storage medium of claim 7, wherein the instructions, when executed, manage aspects of the computing environment comprising:
using the audit function to create a delta of an actual state of the computing environment to a desired state of the computing environment, wherein the delta comprises at least one package change; and
creating a plan with the delta.

9. The computer storage medium of claim 5, wherein the instructions, when executed, manage aspects of the computing environment by calling a logging function to set a type of logging to be used during the deployment of the plurality of computing devices.

10. The computer storage medium of claim 1, wherein the instructions, when executed, manage aspects of the computing environment by calling an impersonate function to override default access credentials.

11. The computer storage medium of claim 1, wherein the instructions, when executed, manage aspects of the computing environment by calling a function to execute a load function, a logging function, and the audit function.

12. The computer storage medium of claim 1, wherein the instructions, when executed, manage aspects of the computing environment by calling an execute function to deploy the plurality of computing devices, wherein the one or more deployment parameters and the one or more deployment functions are associated with an XML-based deployment file.

13. The computer storage medium of claim 1, wherein the instructions, when executed, manage aspects of the computing environment by calling a plan function to upload a plan from a specified location.

14. The computer storage medium of claim 1, wherein the instructions, when executed, manage aspects of the computing environment by determining whether the deployment is correct before using the plurality of computing devices for a defined purpose.

15. A computer system to manage a computing environment comprising:
a manager component configured to:
define an XML-based deployment file, wherein the XML-based deployment file includes one or more deployment parameters and one or more deployment functions associated with a deployment configuration; and
a dispatch component configured to
use the XML-based deployment file to deploy a plurality of computing devices according to the deployment configuration, wherein using the XML-based deployment file further comprises:
executing an audit function of the one or more deployment functions on a first computing device of the plurality of computing devices, comprising:
detecting a first state of the first computing device of the plurality of computing devices;
identifying a first desired state of the first computing device based on the XML-based deployment file; and determining a first delta between the first detected state and the first desired state of the first computing device;

executing the audit function on a second computing device of the plurality of computing devices, comprising:

detecting a second state of the second computing device of the plurality of computing devices;

identifying a second desired state of the second computing device based on the XML-based deployment file; and determining a second delta between the second detected state and the second desired state of the second computing device, wherein the second delta is different from the first delta;

deploying the first computing device of the plurality of computing devices by applying the first delta to the first computing device;

deploying the second computing device of the plurality of computing devices by applying the second delta to the second computing device.

16. The computer system of claim 15, wherein the dispatch component is further configured to generate logging information based on a type of log setting.

17. A computer-implemented method of configuring a deployment comprising:

loading by a dispatch component an XML-based deployment file including one or more deployment parameters and one or more deployment functions, wherein the one or more deployment parameters and the one or more deployment functions define a computing architecture;

executing an audit function of the one or more deployment functions on a first computing device within the computing architecture, comprising:

detecting a first state of the first computing device of the plurality of computing devices;

identifying a first desired state of the first computing device based on the XML-based deployment file; and determining a first delta between the first detected state and the first desired state of the first computing device;

executing the audit function on a second computing device of the plurality of computing devices, comprising:

detecting a second state of the second computing device of the plurality of computing devices;

identifying a second desired state of the second computing device based on the XML-based deployment file; and determining a second delta between the second detected state and the second desired state of the second computing device, wherein the second delta is different from the first delta;

deploying the computing architecture based in part on the use of the XML-based deployment file, further comprising:

deploying the first computing device by applying the first delta to the first computing device; and deploying the second computing device by applying the second delta to the second computing device;

determining if the computing architecture is correct; and using the deployed computing architecture if the computing architecture is correct.

18. The computer-implemented method of claim 17, further comprising validating the computing architecture using a defined schema.

19. The computer-implemented method of claim 17, further comprising logging information associated with deploying the computing architecture.

\* \* \* \* \*